(12) United States Patent
Anderson

(10) Patent No.: US 6,320,735 B1
(45) Date of Patent: Nov. 20, 2001

(54) ELECTROSTATIC DISCHARGE PROTECTION CLAMP FOR HIGH-VOLTAGE POWER SUPPLY OR I/O WITH NOMINAL-OR HIGH-VOLTAGE REFERENCE

(75) Inventor: Warren R. Anderson, Westborough, MA (US)

(73) Assignee: Digital Equipment Corporation, Houston, TX (US)

( * ) Notice: Subject to any disclaimer, the term of this patent is extended or adjusted under 35 U.S.C. 154(b) by 0 days.

(21) Appl. No.: 09/404,981

(22) Filed: Sep. 23, 1999

(51) Int. Cl.$^7$ .................................................... H02H 3/22
(52) U.S. Cl. ............................................ 361/111; 361/56
(58) Field of Search ............................ 361/56, 91.1, 111, 361/91.5

(56) References Cited

U.S. PATENT DOCUMENTS

| | | | |
|---|---|---|---|
| 5,774,318 | * | 3/1999 | McClure et al. ...................... 361/56 |
| 5,886,862 | * | 3/1999 | Anderson et al. ..................... 361/56 |
| 5,978,192 | * | 11/1999 | Young et al. ........................... 361/56 |

* cited by examiner

Primary Examiner—Michael J. Sherry
(74) Attorney, Agent, or Firm—Hamilton, Brook, Smith & Reynolds, P.C.

(57) ABSTRACT

An electrostatic discharge (ESD) protection technique protects a semiconductor device against electrostatic discharge events. The technique uses an ESD protection circuit that includes Darlington-connected clamps between the protected I/O pad and a reference voltage conductor with circuitry to prevent leakage. A control signal that is used to control the clamps is derived from another pad.

17 Claims, 4 Drawing Sheets

ELECTROSTATIC DISCHARGE PROTECTION CLAMP FOR HIGH-VOLTAGE POWER SUPPLY OR I/O WITH NOMINAL-OR HIGH-VOLTAGE REFERENCE

BACKGROUND OF THE INVENTION

A typical integrated circuit (IC) includes an IC package and a semiconductor device, which is physically and electrically connected within the IC package. The semiconductor device typically includes electrostatic discharge (ESD) protection devices that protect the semiconductor device against ESD events that would otherwise cause damage. Generally, the ESD protection devices are located within the semiconductor device in close proximity to semiconductor device pads, which electrically connect to pins of the IC package.

One conventional ESD protection device provides an ESD clamp (or shunt) between the semiconductor pad to be protected and a reference conductor (i.e., a ground conductor). If power is disconnected (e.g., when the semiconductor device is being handled prior to its installation within an IC package, or when an assembled IC is being handled prior to its installation on a circuit board), the ESD protection device shunts or clamps any positive charge on the pad that is above a particular threshold to the reference conductor. If the power is on (e.g., when the assembled IC is installed on a circuit board and is operational), the ESD protection device is deactivated and an incoming signal on the pad is permitted to pass through to other semiconductor device circuitry, i.e., internal circuits of device. An example of such an ESD protection device is described in U.S. application Ser. No. 08/979,376, entitled "Cross-Referenced Electrostatic Discharge Protection Systems and Methods for Power Supplies," filed Nov. 26, 1997, the entire teachings of which are incorporated herein by this reference.

Due to improvements in semiconductor technology, manufacturers can now make transistors smaller thereby reducing semiconductor size and power consumption. The decrease in transistor size has been accompanied by a decrease in transistor voltage tolerance, which is the voltage that can be applied safely across any two terminals of each transistor of the semiconductor device without causing thin oxide damage in the context of MOS-type devices, for example. This maximum tolerable voltage for the transistors is commonly referred to as the rated or process technology voltage. For example, older semiconductor devices were built using a 5V process technology where each transistor could tolerate an operating voltage of 5 Volts (V) across any two terminals without sustaining thin oxide damage. More recently, semiconductor devices have been built using a 3.3V process technology. In such devices, the voltage across any two terminals of each transistor must be less than 3.3V in order to avoid causing thin oxide damage. Presently, manufacturers are implementing 2.5V and 1.5V process technologies, and such improvements in semiconductor technology are expected to continue.

Occasionally, manufacturers combine IC's having different semiconductor technologies on the same circuit board or in the same system. For example, a manufacturer may mix some IC's having semiconductor devices built using a 5V process technology with other IC's having semiconductor devices built using a 3.3V process technology in order to obtain some of the benefits of using 3.3V process IC's (e.g., smaller packaging, lower power consumption, greater speed, lower cost). For this reason, an IC containing a semiconductor device using a 3.3V process technology must often be designed to interface with IC's containing semiconductor devices built using a 5V process technology. Specifically, the 3.3V IC must drive and receive signals at the logic levels expected by the 5V IC's in the system. To accomplish this, the 3.3V IC often requires a 5V power supply to power the 3.3V IC's I/O stages. Therefore, the 3.3V IC contains a mixture of 3.3V and 5V circuits.

Providing ESD protection in a mixed voltage IC tends to complicate the design of the ESD clamp and its control circuit. For example, one known semiconductor device includes a cantilevered ESD clamp and an RC-timed control circuit, which is interconnected between the power supply pad and the ESD clamp, to control deactivation of the ESD clamp. When power is off, the RC-timed circuit maintains ESD clamp in a conductive state for a time period related to the circuit's time constant. This allows the shunting of a short ESD event from the pad to a reference conductor. In contrast, when power is on, the RC-timed circuit operates as a voltage divider to divide a 5 V power supply signal down to a 3.6 V signal, which is used to disable the ESD clamp. Without the reduction in voltage from 5 V to 3.6 V, one or more components of the ESD clamp would be very susceptible to thin oxide damage. An example of such a circuit (hereinafter referred to as the "cantilevered circuit") is described in an article entitled "Protection of High Voltage Power and Programming Pins," by Maloney et al., EOS/ESD Symposium 97–246, (1997).

SUMMARY OF THE INVENTION

While having certain advantages relative to its prior art, the cantilevered circuit does suffer from certain performance problems. In particular, the cantilevered circuit is not well-suited for situations where it is desirable to disable ESD protection using a signal that is independent of the signal received on the ESD protected pad. For example, in the above-described cantilevered circuit, the 3.6 V power supply signal that disables the ESD clamp is derived from the 5 V power supply signal received on the ESD protected pad. The 3.6 V power supply signal is not independent of the 5 V power supply signal. Additionally, the RC-timed deactivation feature of the cantilevered circuit may result in inadequate ESD protection against prolonged ESD events, which are on the order of the time constant of the circuit. Furthermore, when the RC-timed circuit operates as a voltage divider during normal operation, the RC-timed circuit generates a leakage current that increases IC power consumption.

The present invention is directed to a technique for protecting a semiconductor device against ESD events that uses a control voltage that is independent of the pad being protected. The ESD stage provides a conducting path between the pad and a reference conductor. In particular, the technique involves providing protection for a high-voltage pad of a semiconductor device. The pad is high-voltage in the sense that it is designed to receive a voltage, during operation, that is greater than a rated or process voltage for the device. A control signal that is used to signal ESD events is derived from an independent pad, which is intended to receive a nominal voltage, or voltage level that is near or below the process voltage but also a high-voltage, giving the circuit greater flexibility in deployment.

In general, according to one aspect, the invention features an electrostatic discharge protection circuit for a protected, high-voltage pad of a semiconductor device to protect its internal circuits from electrostatic discharge. The protected high-voltage pad receives voltages during the operation of the internal circuits that are greater than a rated voltage of the semiconductor device. The protection circuit comprises a clamp stage. The clamp stage sinks electrostatic charge from the protected high-voltage pad to the reference conductor and away from the internal circuits. A control stage activates the clamp stage to couple electrostatic charge from the protected high-voltage pad and deactivates the clamp stage when the internal circuits are operational by reference to a control signal, which is derived from an independent reference pad. A leakage limiting circuit, however, is also provided, which prevents leakage current through the control stage when the protected pad receives a voltage during operation that is at the voltage received by the reference pad.

In the preferred embodiment, the control stage comprises an inverter circuit and a clamp driver. The inverter circuit biases the clamp driver to activate and deactivate the clamp stage. Also, preferably, the inverter has a leakage control circuit for limiting leakage through the inverter circuit during operation. In one implementation, this inverter leakage control circuit can comprise multiple series, diode-connected transistors.

In other aspects of a preferred embodiment, the leakage limiting circuit is controlled by the voltage on the reference pad. Specifically, the leakage limiting circuit biases a control node of the clamp driver at a voltage of the reference pad in one mode of operation.

In general, according to another aspect, the invention also features an electro-discharge protection method for a protected, high-voltage pad of a semiconductor device. This method comprises activating at least two transistor clamps and a Darlington-connected chain to couple electrostatic charge away from the protected pad to the reference conductor. This clamp stage, however, is deactivated by the control stage when the internal circuits are operational by reference to a control signal which is derived from the reference pad. Finally, leakage current through the control stage is limited when the protected pad receives a voltage during operation that is at the voltage received by the reference pad.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings.

DETAILED DESCRIPTION OF PREFERRED EMBODIMENTS

Figure 1:
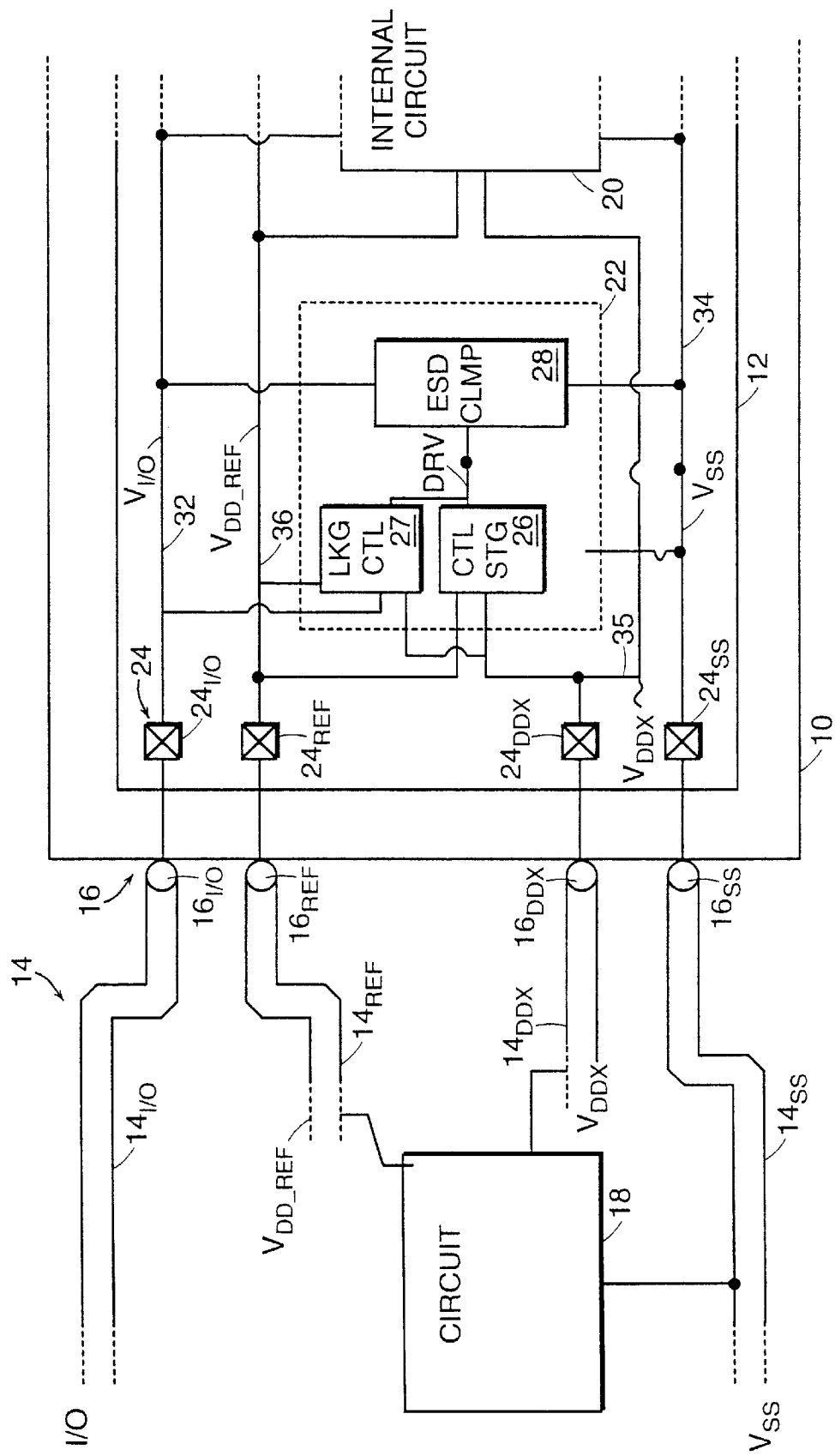
FIG. 1 is a block diagram of an integrated circuit having a semiconductor device that uses an electrostatic discharge (ESD) protection technique according to the present invention.

FIG. 1 shows a portion of a circuit board having an integrated circuit (IC) 10 that includes a semiconductor device 12. During operation, the semiconductor device 12 of the integrated circuit 10 receives voltages on at least some of its pads that are greater than the process voltage of its transistors and provides a conducting path that is activated and deactivated based on a control voltage, which is independent of a pad voltage on the pad, to defuse ESD events.

The IC 10 connects with another circuit 18 through circuit board conductors $14_{I/O}, 14_{REF}, 14_{DDX}, 14_{SS}$ (collectively conductors 14) and IC pins $16_{I/O}, 16_{REF}, 16_{DDX}, 16_{SS}$ (collectively pins 16). By way of example, the circuit 18 is a power supply that provides a power supply signal $V_{DD\_REF}$ on conductor $14_{REF}$, VDDX on $14_{DDX}$, and a reference or ground signal $V_{SS}$ on conductor $14_{SS}$. The conductor $14_{REF}$ and pin $16_{REF}$ may carry a control signal. By way of example, the control signal is an internal power supply signal that serves as a supply voltage for core logic or I/O drive circuits of the IC 10. In the anticipated implementation, the VDD_REF power supply signal is equal to or less than the process voltage of the semiconductor device 12 to thereby allow the IC 10 to obtain the benefit of low voltage circuitry. The VI/O signal is a high voltage, i.e., can be near or higher that the process voltage either continually as is a power signal or on logic transitions as in an information bearing signal. In the preferred embodiment, however, the semiconductor device 12 has a second mode of operation in which VI/O receives a nominal or near-nominal voltage that is near, but can be above or below, the IC's process voltage on logic transitions.

The circuit board conductors $14_{I/O}, 14_{REF}, 14_{DDX}, 14_{SS}$ electrically connect to semiconductor pads $24_{I/O}, 24_{REF}, 24_{DDX}, 24_{SS}$ (collectively pads 24) disposed on a surface of the semiconductor device 12. Within the semiconductor device 12, pad $24_{I/O}$ connects to a signal conductor 32, pad $24_{SS}$ connects to a reference conductor 34, pad $24_{REF}$ connects to a control conductor 36, which also carries the VDD_REF power signal to internal logic. Pad $24_{DDX}$ connects to a internal conductor 35, which also carries VDDX signal, which can be used to drive internal circuits or also as a reference.

The semiconductor device 12 further includes an internal circuit 20 (e.g., an I/O driver or logic gates) and an ESD protection circuit 22. The internal circuit 20 and the ESD protection circuit 22 connect to the signal conductor 32, the reference conductor 34, the control conductor 36 and additional power supply conductor 35. In the example, the internal circuit 20 interprets VI/O signal as data based on 5 V transitions according to established physical layer protocol for PCI interfaces.

The ESD protection circuit 22 includes a control stage 26, an ESD clamping stage 28, and a leakage control circuit 27. The control stage 26 connects to the VI/O logic signal conductor 32, the VDD_REF control conductor 36, VDDX conductor 35, VSS reference conductor 34, and internal node DRV, The ESD clamping stage 28 connects to the VI/O conductor 32, the VSS reference conductor 34, and node DRV. The leakage control circuit 27 is interconnected between VDD_REF control conductor 36, VI/O conductor 32, VDDX conductor 35, and the VSS reference conductor 34.

The ESD protection circuit 22 protects the semiconductor device 12 against ESD events that occur on the pad $24_{I/O}$. In particular, the control stage 26 provides, in response to the control voltage VDD_REF, deactivating voltages on node DRV when the control voltage VDD_REF is non-zero and in a steady state such as during normal operation.

The ESD clamping stage 28 provides a conducting path between the pad $24_{I/O}$ and the VSS reference conductor 34. The conducting path is activated and deactivated based on the control voltage VDD_REF. When the control voltage is at the same electrical potential as the voltage on the VSS reference conductor 34 (e.g., before the IC 10 has been installed on the circuit board), the ESD clamping circuit 28 provides the conducting path for ESD events. Accordingly, the ESD protection circuit 22 protects semiconductor circuitry such as the internal circuit 20 against positive ESD events on the pad $24_{I/O}$ by shunting positive ESD charge from the pad $24_{I/O}$ to the reference conductor 34. When the control voltage VDD_REF is high relative to the voltage on the control conductor (e.g., after the IC 10 has been installed on the circuit board and when the IC 10 is powered up), the ESD clamping stage 28 is deactivated. Accordingly, the VI/O signal is allowed to transmit information to the IC 20 (e.g., the internal circuit 20 and/or I/O circuits and stage of the semiconductor device 12).

Figure 2:
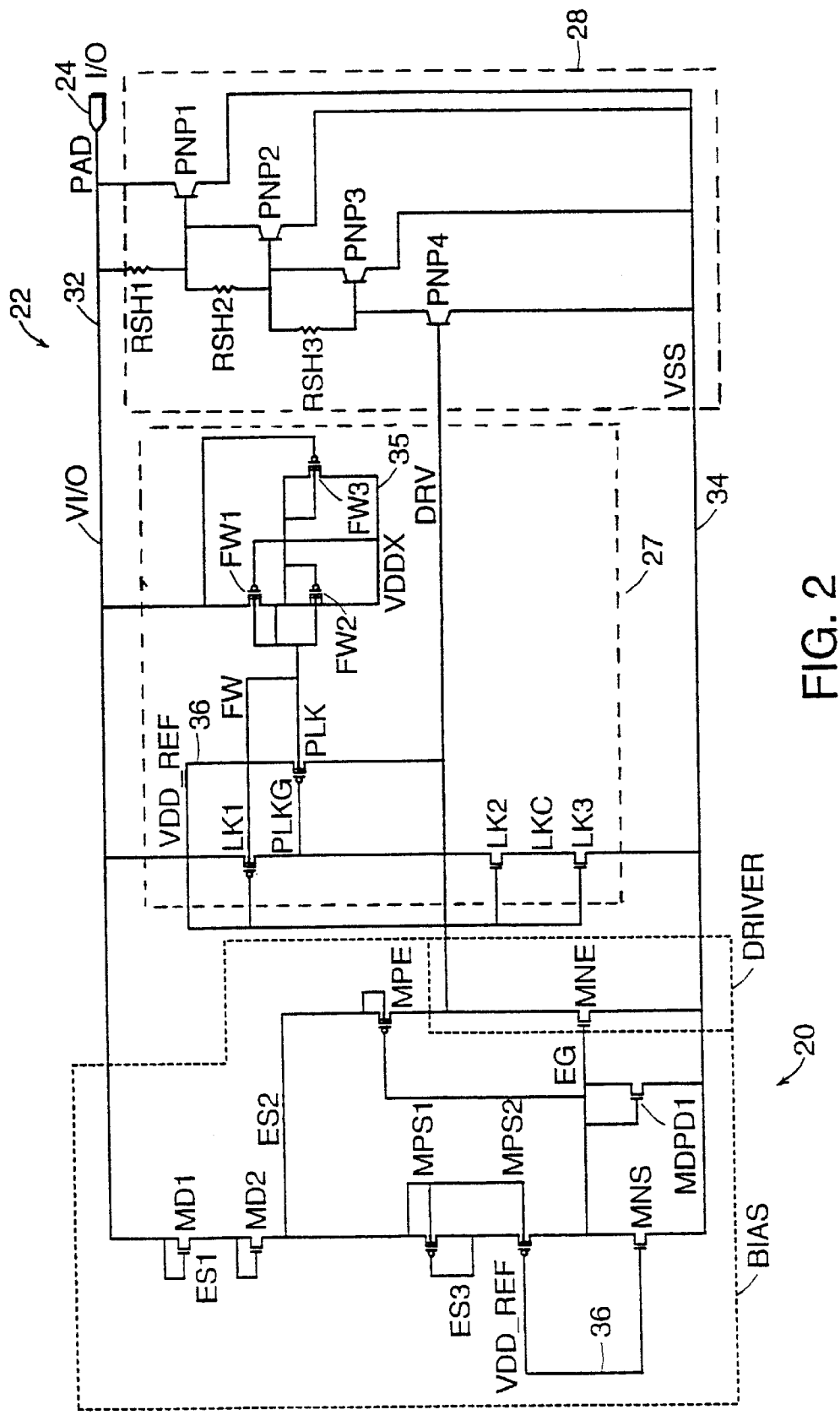
FIG. 2 is a circuit diagram of circuitry within the inventive semiconductor device of FIG. 1, and specifically the ESD protection circuit according to the present invention.

FIG. 2 shows details of the ESD protection circuit 22 of FIG. 1.

In the preferred embodiment, the ESD clamp stage 28 comprises a Darlington connected PNP chain. Specifically, PNP4 is connected to node DRV. PNP4 pulls from the base of PNP3, which pulls from the base of PNP2, which pulls from the base of PNP1, which is connected to pad $24_{I/O}$ or the VI/O conductor 32.

While the Darlington-connected PNP chain could be replaced with a CMOS technology such as an NMOS stack, the snap-back failure current may be too low. This adds a large amount of area and capacitance to pad $24_{I/O}$, which may be unacceptable where the pad to be protected is for I/O. Thus, the less area-intensive PNP chain is preferred.

The clamping stage 28 is activated and deactivated based upon the voltage of node DRV. This node is driven by driver transistor MNE. Thus, transistor MNE drives the bottom base of the PNP stack of the clamping stage 28.

The driver transistor MNE is controlled via node EG by a bias network BIAS. Generally, the BIAS network is an inverter driven from the signal on the VDD_REF conductor 36. Specifically, the inverter of the BIAS network drives node EG low during normal operation and high during ESD events.

The bias network BIAS comprises diode-connected transistors MD1, MD2, and MPS1. These transistors drop the voltage from the protected I/O pad $24_{I/O}$ to avoid excessive leakage through transistor MPS2. Additionally, these diode-connected transistors minimize the voltage drop across MPS2 to meet reliability criteria. Similarly, device MPE limits the drain voltage on driver transistor MNE during normal operation to also meet reliability criteria with respect to MNE.

Device MDPD1 keeps the gate voltage on driver transistor MNE within safe limits during ESD events.

Leakage control circuit 27 minimizes leakage during normal operation, when the protected pad $24_{I/O}$ is at the same voltage as control conductor VDD_REF. This allows the same circuit to be used for 3.3V and 5V PCI interfaces. Without the bias control circuit 27, the off-current driver transistor MNE would be amplified through clamp device PNP4 and could exceed the specifications for pad leakage current.

The bias control network biases the DRV node at the voltage level of VDD_REF conductor 36 during normal operation when the protected pad $24_{I/O}$ is at or below the voltage of VDD_REF conductor 36. This way, the conductor VDD_REF supplies the leakage current for the driver transistor MNE instead of the protected pad $24_{I/O}$.

Devices FW1, FW2, FW3 make up a floating well bias generator. These devices are also required for the floating well output driver for the semiconductor device. During operation, VDD_REF reaches a normal range of 3 Volts. As a result, node EG is low deactivating the ESD clamping stage 28 via the operation of driver transistor MNE. In contrast, during ESD events, node EG is pulled high driving node DRV low, thereby activating the clamping stage 28.

In implementation, a resistor shunt network of resistors RSH1, RSH2, RSH3 is provided across the emitter-based junctions of PNP clamp devices PNP3, PNP2, PNP1. This resistor shunt network is necessary to shunt the transient current from transient charging and base transit time effects. For example, when the pad switches from 0 Volts to 5 Volts during normal operation, each PNP transistor PNP1–PNP4 is initially biased off. As the voltage of the protected pad $24_{I/O}$ rises, the PNP transistors are slightly forward biased. Without the resistance shunt network RSH1–RSH3, some amount of current is needed at each PNP device in the stack to supply the charge to establish the slight forward bias across their emitter-base junctions. The charging current comes from the base of the upstream PNP. This current gets amplified at each PNP stage as it makes its way from the pad. Without the resistor network in place, emitter-base charge for each of the PNP devices downstream can come through the resistors instead of the upstream PNP device, thereby reducing the switching capacitance on the I/O network.

Figure 3:
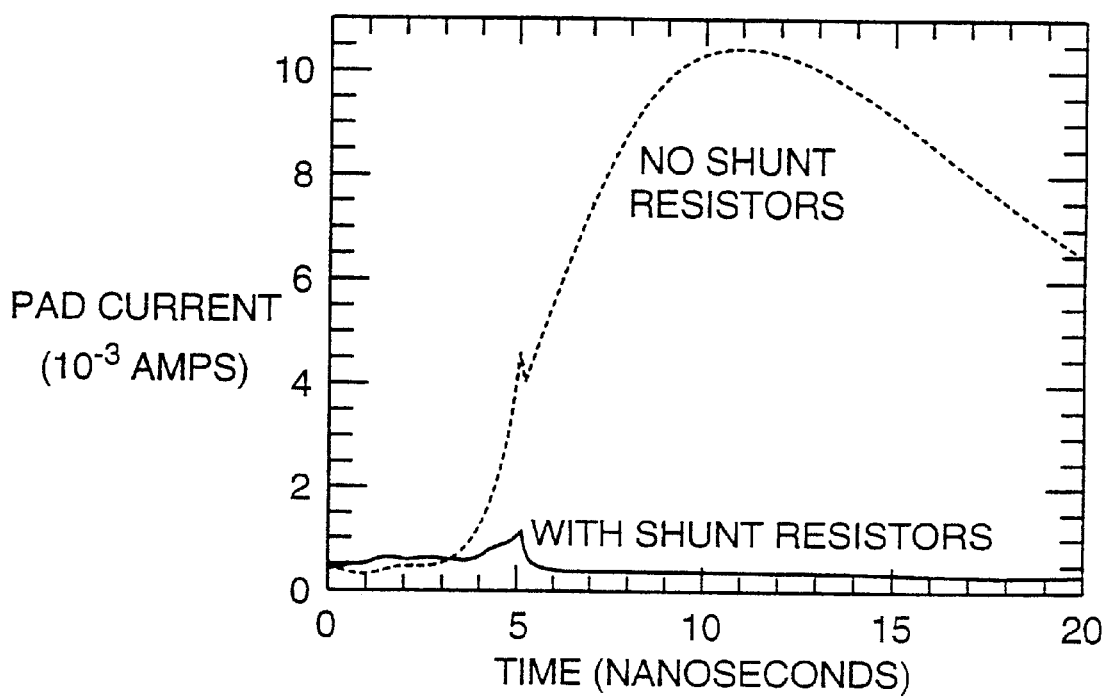
FIG. 3 is a plot of pad current as a function of time in nanoseconds with and without the shunt resistor network.

FIG. 3 is a plot of pad current as a function of time in nanoseconds. It demonstrates the impact of the shunt resistors on the current or at the pad when the external device drives the pad from 0 to 5 Volts. One simulation is run with resistors in place and the others without the resistors. There is a ten-fold reduction in transient current draw with the shunt resistors which greatly reduces the capacitance of the ESD clamping stage 28.

Figure 4:
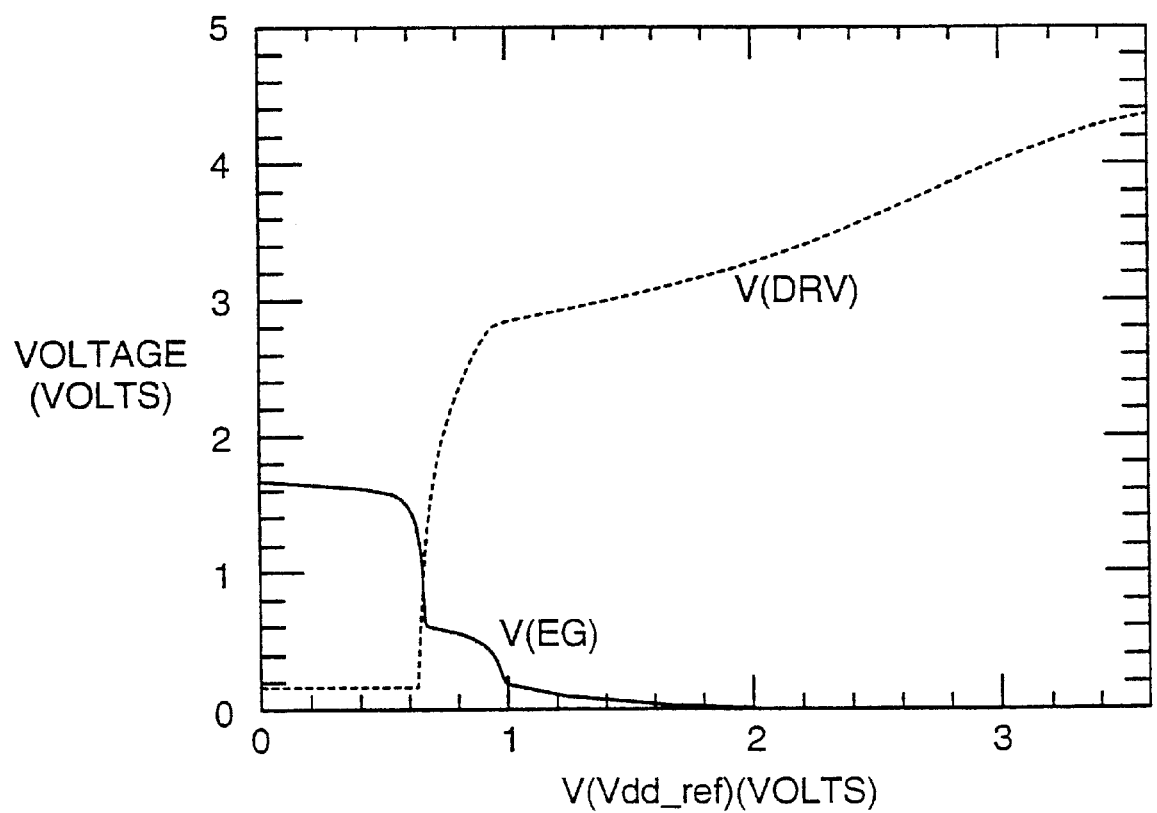
FIG. 4 is a plot of the transfer curves for nodes DRV and EG as a function of the voltage of conductor VDD_REF with the pad at 5 V.

FIG. 4 is a plot of voltage as a function of the voltage of conductor VDD_REF with VI/O at 5 Volts. This plots the transfer curves for node DRV and EG. When DRV is swept from 0 to 3.6 Volts, the circuit stabilizes such that node EG goes low and node DRV goes high deactivating the clamping stage 28 during normal operation.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An electrostatic discharge protection circuit for a protected, high-voltage pad of a semiconductor device to protect its internal circuits from electrostatic discharge, the protected high-voltage pad being designed to receive voltages during the operation of the internal circuits that are greater than a rated voltage of the semiconductor device, the protection circuit comprising:

a clamp stage, comprising at least two transistor clamps in a darlington-connected chain between the protected high-voltage pad and a reference conductor, that sinks electrostatic charge from the protected high-voltage pad to the reference conductor and away from the internal circuits;

a control stage that activates the clamp stage to couple electrostatic charge from the protected high-voltage pad and deactivates the clamp stage when the internal circuits are operational by reference to a control signal, which is derived from a reference pad.

2. The electrostatic discharge protection circuit of claim 1, wherein the control stage comprises an inverter circuit and a clamp driver, the inverter circuit biasing the clamp driver to activate and deactivate the clamp stage.

3. The electrostatic discharge protection circuit of claim 2, further comprising an inverter leakage control circuit for limiting leakage through the inverter circuit during operation.

4. The electrostatic discharge protection circuit of claim 3, wherein the inverter leakage control circuit comprises multiple, series diode-connected transistors.

5. The electrostatic discharge protection circuit of claim 1, further comprising a leakage limiting circuit that prevents leakage current through the control stage when the protected pad receives a voltage during operation that is at or near the voltage received by the reference pad, wherein the leakage limiting circuit is controlled by the voltage on the reference pad.

6. The electrostatic discharge protection circuit of claim 1, further comprising a leakage limiting circuit that prevents leakage current through the control stage when the protected pad receives a voltage during operation that is at or near the voltage received by the reference pad, wherein the leakage limiting circuit controls a clamp driver, which activates and deactivates the clamp stage.

7. The electrostatic discharge protection circuit of claim 1, wherein the leakage limiting circuit biases a control node of the clamp driver at a voltage of the reference pad.

8. An electrostatic discharge protection circuit for a protected, I/O pad of a semiconductor device to protect its internal circuits from electrostatic discharge, the protected I/O pad being designed to receive voltages during the operation of the internal circuits that are greater than a rated voltage of the semiconductor device, the protection circuit comprising:

a clamp stage that sinks electrostatic charge from the protected pad to the reference conductor and away from the internal circuits;

a control stage that activates the clamp stage to couple electrostatic charge from the protected pad and deactivates the clamp stage when the internal circuits are operational by reference to a control signal, which is derived from a reference pad, the control stage comprising an inverter circuit and a clamp driver, the inverter circuit biasing the clamp driver to activate and deactivate the clamp stage; and a leakage limiting circuit that prevents leakage current through the clamp driver when the protected pad receives a voltage during operation that is at the voltage received by the reference pad by biasing an output node of the clamp driver at a voltage of the reference pad.

9. An electrostatic discharge protection method for a protected, high-voltage pad of a semiconductor device to protect its internal circuits from electrostatic discharge, the protected high-voltage pad being designed to receive voltages during the operation of the internal circuits that are greater than a rated voltage of the semiconductor device, the protection method comprising:

activating at least two transistor clamps in a darlington-connected chain to couple electrostatic charge away from the protected pad to a reference conductor and away from the internal circuits with a control stage; and deactivating the clamp stage with the control stage when the internal circuits are operational by reference to a control signal, which is derived from a reference pad.

10. The electrostatic discharge protection method of claim 9, further comprising differentially driving transistor clamps to activate and deactivate the transistor clamps.

11. The electrostatic discharge protection method of claim 9, further comprising biasing a clamp driver to activate and deactivate the clamp stage with an inverter circuit.

12. The electrostatic discharge protection method of claim 11, further comprising limiting leakage through the inverter circuit during operation.

13. The electrostatic discharge protection method of claim 12, further comprising limiting inverter leakage using series diode-connected transistors.

14. The electrostatic discharge protection method of claim 9, further comprising limiting leakage current through the control stage by reference to the voltage on the reference pad when the protected pad receives a voltage during operation that is at the voltage received by the reference pad.

15. The electrostatic discharge protection method of claim 14, wherein the step of controlling the leakage current by reference to the voltage of the reference pad comprises biasing an output node of a clamp driver, which activates the transistor clamps, at a voltage of the reference pad.

16. An electrostatic discharge protection circuit for a protected, high-voltage pad of a semiconductor device to protect its internal circuits from electrostatic discharge, the protected high-voltage pad being designed to receive voltages during the operation of the internal circuits that are greater than a rated voltage of the semiconductor device, the protection circuit comprising:

means for sinking electrostatic charge from the protected high-voltage pad to the reference conductor and away from the internal circuits;

means for activating the sinking means to couple electrostatic charge from the protected high-voltage pad and deactivating the sinking means when the internal circuits are operational by reference to a control signal, which is derived from a reference pad; and means for preventing leakage current through the activating means when the protected pad receives a voltage during operation that is at the voltage received by the reference pad.

17. A system board comprising an integrated circuit, which includes an electrostatic discharge protection circuit for a protected, high-voltage pad of a semiconductor device to protect its internal circuits from electrostatic discharge, the protected high-voltage pad being designed to receive voltages during the operation of the internal circuits that are greater than a rated voltage of the semiconductor device, the protection circuit comprising:

a clamp stage, comprising at least two transistor clamps in a darlington-connected chain between the protected high-voltage pad and a reference conductor, that sinks electrostatic charge from the protected high-voltage pad to the reference conductor and away from the internal circuits;

a control stage that activates the clamp stage to couple electrostatic charge from the protected high-voltage pad and deactivates the clamp stage when the internal circuits are operational by reference to a control signal, which is derived from a reference pad; and a leakage limiting circuit that prevents leakage current through the control stage when the protected pad receives a voltage during operation that is at the voltage received by the reference pad.

* * * * *

UNITED STATES PATENT AND TRADEMARK OFFICE
CERTIFICATE OF CORRECTION

PATENT NO. : 6,320,735 B1
DATED : November 20, 2001
INVENTOR(S) : Warren R. Anderson It is certified that error appears in the above-identified patent and that said Letters Patent is hereby corrected as shown below:

Column 7,
Line 29, delete "claim 1" and insert -- claim 6 --

Signed and Sealed this

Eighteenth Day of June, 2002

*Attest:*

*Attesting Officer*

JAMES E. ROGAN
*Director of the United States Patent and Trademark Office*